Nov. 24, 1942.  C. E. HEMMINGER  2,303,047
CATALYTIC TREATMENT OF HYDROCARBONS
Filed Aug. 22, 1940
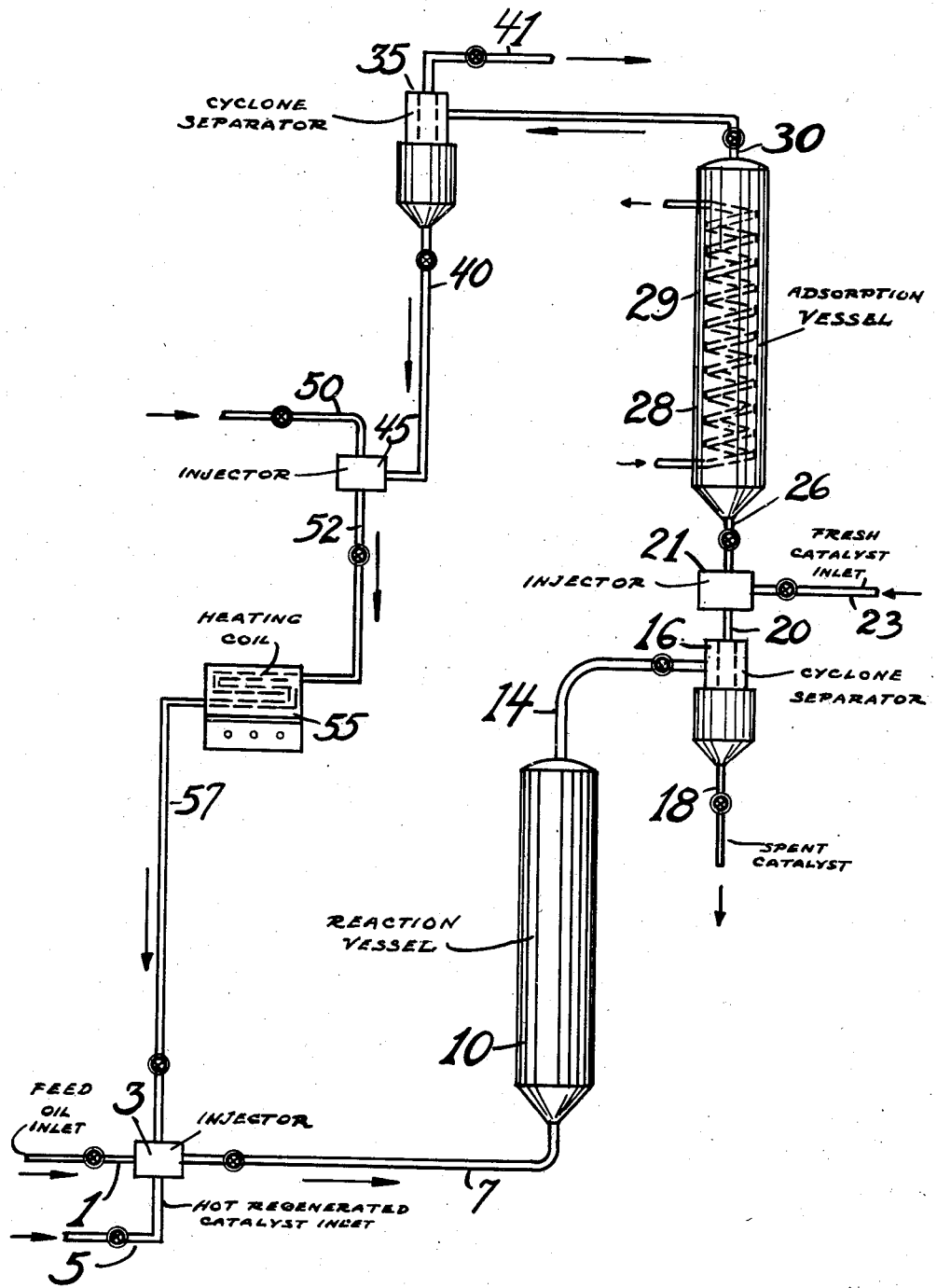

Patented Nov. 24, 1942

2,303,047

UNITED STATES PATENT OFFICE 2,303,047

CATALYTIC TREATMENT OF HYDROCARBONS

Charles E. Hemminger, Westfield, N. J., assignor to Standard Oil Development Company, a corporation of Delaware Application August 22, 1940, Serial No. 353,617

8 Claims. (Cl. 196—52)

The present invention relates to the art of treating petroleum hydrocarbons, and more particularly it relates to improvements in the catalytic conversion of petroleum hydrocarbons, such as gas oils, to form desired products, such as motor fuel of improved octane rating.

Generally speaking, there are two methods of treating hydrocarbons catalytically to form products of desired properties. That is to say, there are two general types of processes in which, let up say, gas oil is cracked to form gasoline. In one of these processes a stationary bed of catalyst is disposed in a reaction vessel and heated gas oil is forced through the bed of catalyst, the gas oil having an inlet temperature of from about 825° F.–900° F. and the catalyst is ordinarily, after regeneration, at a temperature of about 1000° F. In this type of operation, the process is intermittent with respect to any given reactor since the reactor must be periodically removed from the on-stream operation in order to regenerate the catalyst. The other type of operation involving catalytically converting hydrocarbons is one in which the process is characterized by its continuity of operation made possible by the fact that a powdered catalyst is suspended in the reaction vapors as they flow continuously through the reaction vessel during the conversion. The suspended catalyst type of operation is, in some respects, superior to the stationary bed type of operation, e. g., since the latter results in a more unfavorable product distribution in that larger amounts of coke and gas are formed from a given amount of charging stock.

My present invention is directed toward improvements in the art of converting hydrocarbons in an operation in which the catalyst is suspended in the vapors during the conversion.

An object of my invention is to so manipulate an oil cracking operation so as to recover from the reaction vapors containing gasoline, gas oil and normally gaseous hydrocarbons a quantity of unconverted gas oil by means of adsorption of the gas oil in a cooled added catalyst and then returning the cooled catalyst containing the adsorbed gas oil to the reaction zone.

Another object of my invention is to crack a gas oil heated to reaction temperatures in the presence of a powdered catalyst and thereafter to separate the catalyst from the reaction vapors, to cool the latter, to add fresh catalyst thereto whereupon at least a portion of the gas oil is adsorbed by the catalyst return to the reaction zone.

A specific object of my invention is to add fresh catalyst to the reaction vapors resulting from catalytically cracking gas oil, the added catalyst being at a lower temperature than the reaction vapors whereby unconverted gas oil is cooled and adsorbed by the catalyst, separating the catalyst from the reaction vapors and returning the catalyst containing adsorbed gas oil to the reaction zone.

Other and further objects of my invention will appear from the following more complete descriptions.

The accompanying drawing shows diagrammatically and in partial vertical section, suitable apparatus in which my invention may be carried into practical effect.

Referring to the drawing in connection with a concrete example, oil vapors at reaction temperatures, say gas oil having an A. P. I. gravity of about 25° is heated to a temperature of about 825° F., and is discharged into the system shown in the drawing through line 1 and thence injected into an injector 3 where it admixes with hot regenerated catalyst, say catalyst at a temperature of about 1050° F. introduced into the injector from line 5. As will more fully appear hereinafter, catalyst containing adsorbed gas oil is also discharged into injector 3 through line 57. This catalyst may be in the form of powder, say powder of such a size that 1% is retained on an 80 mesh screen, and 20% passes through a 325 mesh screen, the other 79% being a size intermediate these limits. The amount of catalyst mixed with the oil may vary within fairly wide limits, but good results are obtained by employing 100 lbs. of oil with 400 lbs. of catalyst. In the injector 3 a suspension of catalyst in oil is formed, and this suspension is withdrawn through line 7, thence discharged into the bottom of a reaction vessel 10 where it passes upwardly toward the outlet at the top. The linear velocity of the suspension moving through the vessel 10 is sufficient to prevent an appreciable downward settling of the catalyst. The vapors remain resident in the reaction zone for a period of 5–100 seconds, with 10 seconds resident time giving good results. The reaction vapors containing the catalyst suspended therein are withdrawn from reaction vessel 10 through line 14, thence discharge into a cyclone separator 16 where the spent catalyst is removed from the reaction vapors and moves by gravity to outlet 18 and thereafter is conducted to any known apparatus (not shown), where the catalyst is revivified. The vapors, on the other hand, are withdrawn from the cyclone separator 16 through line 20 and are admixed in injector 21 with fresh or regenerated catalyst, the latter being introduced into injector 21 through line 23, in which injector, the fresh catalyst is suspended in the oil vapors in the same manner as in injector 3. Alternatively, all of the catalyst may be introduced into the cracking unit through line 23, i. e., catalyst introduction through line 5 may be eliminated. The temperature of the catalyst added through line 23 is about 300° F. to 800° F., that is to say, it is cooler than the oil vapors with which it contacts. The suspension of catalyst in cracked vapors is withdrawn from injector 21 through line 26 and thence forced into a vessel 28. In vessel 28 the cooler catalyst contacting the hotter vapors causes condensation on the catalyst of at least a portion of the vaporized and unconverted gas oil. The resident time for catalyst and vapors in vessel 28 is less than in reactor 10, and preferably should be from 1–50 seconds. It is also pointed out that instead of cooling the vapors by means of a catalyst having a lower temperature than the vapors, other cooling means may be resorted to, such as a coil 29, through which a cooling medium such as water may be circulated, which coil in contact with the vapors will abstract heat therefrom. The catalyst containing adsorbed gas oil, together with the lighter vaporized fractions, such as the gasoline fraction, is withdrawn through line 30, thence discharged into a cyclone separator 35 where the catalyst is separated from the gasiform hydrocarbons and passes by gravity out of the cyclone separator into a conduit 40. The gasoline vapors and unadsorbed gas oil vapors, normally gaseous hydrocarbons and the like, are withdrawn from cyclone separator 35 through line 41 for delivery to fractionating and condensing equipment (not shown). The catalyst in line 40 is discharged into injector 45 into which is also injected steam or other gas through line 50, with the result that a suspension or entrainment of catalyst and steam is formed in the said injector, which suspension is thence withdrawn through line 52 and forced into a heating coil 55 where the temperature of the catalyst is increased to from about 700° F. to 1000° F. Thereafter the catalyst is withdrawn from the heater through line 57 and discharged into injector 3 for return to reactor 10 with fresh charging oil as previously indicated.

The foregoing concrete example is purely illustrative of my invention and does not constitute a limitation thereon since numerous modifications thereof will be apparent to those skilled in this art. In general, the following range of conditions give good results in my process:

| | |
|---|---|
| Weight ratio of oil to catalyst | 0.1 to 2 parts oil per part of catalyst |
| Temperature in the reaction zone | 700° F.–1000° F. |
| Time of residence of reaction vapors in reaction zone | 3–50 seconds |
| Time of residence of vapors in absorption zone | 1–50 seconds |

To recapitulate, my present invention relates broadly to improvements in cracking oil and in particular to causing adsorption of unconverted gas oil by catalyst to remove at least a portion of the unconverted gas oil from the reaction vapors recovered from the cracking zone. In other words, I provide means for what, in substance and effect, amounts to a fractionation of the reaction vapors to remove unconverted hydrocarbons and I cause these hydrocarbons to be returned to the reaction zone, the said fractionation being accomplished by means of fresh catalyst which has a temperature below that of the cracked vapors.

It is believed to be obvious that numerous modifications of my invention may be made by those who are skilled in this art. For instance, the catalyst may be removed from the reaction vapors in a series of cyclone separators rather than employing merely one, as in the modification shown in the drawing.

It is within the purview of my invention to employ a type of operation in which the linear velocity of the suspension of catalyst in oil vapors is sufficiently slow so that hindered settling takes place in the reaction zone. In this type of operation, the catalyst would be withdrawn from the bottom of the zone, while the vapors would be withdrawn from the top of the zone. Also, in this type of operation, it is possible to add the fresh catalyst employed for the purpose of fractionating the cracked vapors at a point near the top of the reaction zone, whereupon the catalyst would pass by gravity countercurrent to the reaction vapors and effect removal of at least a part of the higher boiling fractions, such as gas oil, from the reaction vapors.

It is pointed out that the linear velocities of the suspension in vessels 10 and 28 may be sufficiently high, let us say 5-ft. per second, so that no appreciable settling takes place as heretofore indicated, but, on the other hand, the velocity of the gas stream may be lowered so as to permit "slippage" or hindered settling of the catalyst so that the catalyst may remain in these vessels for a considerably longer time than the vapors. Obviously many factors will influence the velocity to attain some desired amount of "slippage" of catalyst or hindered settling of the same, but in general, it may be said that where the velocity is about 2-ft. per second the tendency of the catalyst to settle downwardly in the said vessels is increased so that the concentration of catalyst in the vessels 10 and 28 will be greater than in the conduits leading thereto and thus a given amount of catalyst will contact more hydrocarbon oil vapors than in the case where the velocity is 5-ft. per second or more.

As a further alternative, it is pointed out that this invention not only includes recycling unconverted gas oil to the reaction coil but also includes successive pass operations where the gas oil is subjected to cracking conditions in the presence of a catalyst in two or more successive stages.

As employed herein "active" catalyst signifies either freshly prepared catalyst or used catalyst which has been regenerated.

What I claim is:

1. A method for converting catalytically hydrocarbon oils of relatively high boiling range to products of relatively lower boiling range, which comprises vaporizing the oils, suspending a powdered catalyst in the vapors, causing the vapors to be injected into a reaction zone where they are permitted to remain for sufficient time at reaction temperatures to effect the desired conversion, withdrawing the reaction vapors from the reaction zone, removing catalyst therefrom, adding a portion of active catalyst to the reaction vapors, cooling said vapors whereby at least a portion of a gas oil is adsorbed by the added catalyst, separating the catalyst from the gasiform hydrocarbons and returning the catalyst with adsorbed gas oil to the reaction zone.

2. A method for converting catalytically hydrocarbon oils of relatively high boiling range into products of relatively lower boiling range, which comprises vaporizing the oils, suspending a powdered catalyst in the vapors, injecting the vapors containing catalyst suspended therein into a reaction zone, where they are permitted to remain for a sufficient period of time at reaction temperatures to effect the desired reaction, withdrawing reaction vapors from the reaction zone, removing spent catalyst therefrom, adding a portion of active catalyst having a substantially lower temperature than the reaction vapors to said vapors whereby higher boiling fractions are adsorbed by the active catalyst, separating the catalyst from the gasiform hydrocarbons, and conducting the catalyst with adsorbed gas oil to the reaction zone.

3. The process set forth in claim 2, in which the fresh catalyst added to the reaction vapors has a temperature within the range of from about 400° F. to 800° F.

4. The method set forth in claim 1, in which the cracked vapors are cooled by means of a fluid cooling means.

5. The method set forth in claim 1, in which the total amount of catalyst employed in the reaction zone is added to the process at a point immediately following the removal of spent catalyst from the cracked vapors.

6. The method set forth in claim 1, in which only a portion of the total catalyst employed in the reaction zone is added to the cracked vapors, the remainder of the catalyst being added to the vaporized charging stock.

7. The method set forth in claim 1, in which the catalyst containing adsorbed gas oil is dispersed in a fluid medium heated to reaction temperatures and conducted to the reaction zone.

8. The process of catalytically cracking gas oil in vapor phase which comprises vaporizing said gas oil, suspending a powdered catalyst therein, discharging the suspension thus formed into a reaction zone where it is maintained under cracking conditions for a period of time sufficient to effect the desired conversion, withdrawing the reaction vapors and catalyst suspended therein from said reaction zone, separating the catalyst from the vapors, adding a portion of active catalyst to the reaction vapors, cooling the vapors whereby gas oil is adsorbed by the said catalyst, separating the catalyst from said vapors and conducting the catalyst with adsorbed gas oil to the reaction zone.

CHARLES E. HEMMINGER.